(12) United States Patent
Loh et al.

(10) Patent No.: US 7,721,268 B2
(45) Date of Patent: May 18, 2010

(54) METHOD AND SYSTEM FOR A CALL STACK CAPTURE

(75) Inventors: Susan Loh, Atlanta, GA (US); Amjad Hussain, Bellevue, WA (US); Bor-Ming Hsieh, Redmond, WA (US); John Robert Eldridge, Bellevue, WA (US); Todd W. Squire, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1074 days.

(21) Appl. No.: 10/957,264

(22) Filed: Oct. 1, 2004

(65) Prior Publication Data

US 2006/0075386 A1    Apr. 6, 2006

(51) Int. Cl.
*G06F 9/44* (2006.01)
(52) U.S. Cl. .................... 717/131; 717/127; 717/130
(58) Field of Classification Search .................... None
See application file for complete search history.

(56) References Cited

U.S. PATENT DOCUMENTS

| | | | | |
|---|---|---|---|---|
| 5,815,720 A * | 9/1998 | Buzbee | ................ | 717/158 |
| 6,321,263 B1 * | 11/2001 | Luzzi et al. | ................ | 709/224 |
| 6,553,564 B1 * | 4/2003 | Alexander et al. | ........ | 717/128 |
| 6,742,179 B2 * | 5/2004 | Megiddo et al. | ........... | 717/130 |
| 6,799,236 B1 * | 9/2004 | Dice et al. | ................ | 710/200 |
| 6,857,120 B1 * | 2/2005 | Arnold et al. | ............. | 717/157 |
| 6,904,594 B1 * | 6/2005 | Berry et al. | ............... | 718/100 |
| 6,915,509 B1 * | 7/2005 | Chkodrov et al. | .......... | 717/124 |
| 6,959,441 B2 * | 10/2005 | Moore | ................ | 719/328 |
| 7,114,150 B2 * | 9/2006 | Dimpsey et al. | ............ | 717/131 |
| 7,140,008 B2 * | 11/2006 | Chilimbi et al. | ............ | 717/158 |
| 7,293,259 B1 * | 11/2007 | Dmitriev | ................ | 717/130 |
| 7,293,260 B1 * | 11/2007 | Dmitriev | ................ | 717/130 |
| 7,386,839 B1 * | 6/2008 | Golender et al. | ............ | 717/131 |
| 7,389,497 B1 * | 6/2008 | Edmark et al. | .............. | 717/130 |
| 7,434,210 B1 * | 10/2008 | Tucker | ................ | 717/138 |
| 7,546,587 B2 * | 6/2009 | Marr et al. | ................ | 717/127 |
| 2003/0051037 A1 * | 3/2003 | Sundaram et al. | .......... | 709/227 |
| 2004/0194063 A1 * | 9/2004 | Pereira | ................ | 717/124 |
| 2005/0155019 A1 * | 7/2005 | Levine et al. | ............... | 717/127 |
| 2005/0229176 A1 * | 10/2005 | Findeisen | ................ | 718/100 |

(Continued)

OTHER PUBLICATIONS

Anderson, J.M. et al., "Continuous Profiling: Here Have All the Cycles Gone?", *ACM Transactions on Computer Systems*, 1997, 15(4), 357-390.

(Continued)

*Primary Examiner*—Tuan Q Dam
*Assistant Examiner*—Hanh T Bui
(74) *Attorney, Agent, or Firm*—Woodcock Washburn LLP (57) ABSTRACT

A method of acquiring software profile information of a target software application includes receiving a programmed interrupt while executing an application in a computer system, servicing the interrupt such that call stack information is acquired and processing the call stack information to produce statistical information concerning function calls. The call stack information includes program counter and other information which is derived from the target application as well as operating system. Some or all of the call stack information may be recorded. The statistical information includes statistics concerning the number of samples wherein a series of functions calls are included in the call stack information and the number of samples wherein a set of function calls are at the top of the call stack information.

21 Claims, 5 Drawing Sheets

U.S. PATENT DOCUMENTS

2006/0048136 A1* 3/2006 Vries et al. .................. 717/174
2006/0092846 A1* 5/2006 Loh et al. .................... 370/241

OTHER PUBLICATIONS

Burrows, M. et al., "Efficient and Flexible Value Sampling", *Architectural Support for Programming Languages and Operating Systems, Proceedings of the 9th International Conference on Architectural Support for Programming Languages and Operating Systems*, 2000, 160-167.

Dean, J. et al., "*ProfileMe:*Hardware Support for Instruction-Level Profiling on Out-of-Order Processors", *International Symposium on Microarchitecture, Proceedings of the 30th Annual ACM/IEEE International Symposium on Microarchitecture*, 1997, 292-302.

Elbaum, S. et al., "An Empirical Study of Profiling Strategies for Released Software and their Impact on Testing Activities", *International Symposium on Software Testing and Analysis, Proceedings of the 2004 ACM SIGSOFT International Symposium on Software Testing and Analysis*, 2004, 65-75.

Gordon-Ross, A. et al., "Frequent Loop Detection Using Efficient Non-Intrusive On-Chip Hardware", *International Conference on Compilers, Architectures and Synthesis for Embedded Systems, Proceedings of the International Conference on Compilers, Architectures and Synthesis*, 2003, 117-124.

Vetter, J., "Dynamic Statistical Profiling of Communication Activity in Distributed Applications", *joint International Conference on Measurement and Modeling of Computer Systems, Proceedings of the 2002 ACM SIGMETRICS International Conference on Measurement and Modeling of Computer Systems*, 2002, 240-250.

In the United States Patent and Trademark Office:. Non-Final Office Action in re:U.S. Appl. No. 10/957,447, filed Oct. 1, 2004, dated May 14, 2008, 49 pages.

* cited by examiner

METHOD AND SYSTEM FOR A CALL STACK CAPTURE

REFERENCE TO RELATED APPLICATIONS

This application is related to co-pending, commonly assigned, patent application Ser. No. 10/940,454, entitled "Call Stack Capture Using Interrupt Driven Architecture" filed Sep. 15, 2004, which is incorporated herein by reference in its entirety.

FIELD OF THE INVENTION

This invention relates in general to the field of software development. More particularly, this invention relates to profiling software performance in an embedded system development environment.

BACKGROUND OF THE INVENTION

In general, software profiling is a technique for measuring or estimating what parts of a complex hardware and software system are consuming the most computing resources. The most common profiling tools aim to determine which segments of code within an application or service are consuming the most processor time and to find performance "bottlenecks" where optimization can be most beneficial to the running time. Profiling can also be applied to the consumption of other resources, such as processor caches, operating system APIs, memory, and I/O devices.

The two most common approaches used in processor-time profiling are sampling and "per-occurrence" measurement. Sampling involves choosing a subset of interesting events, determining the cause of those events, and reporting the frequency of those causes. For example processor-time sampling involves measuring, at regular time intervals, which code was running; such as noting, at regularly-spaced times, the value in the processor's instruction pointer register.

Figure 1:
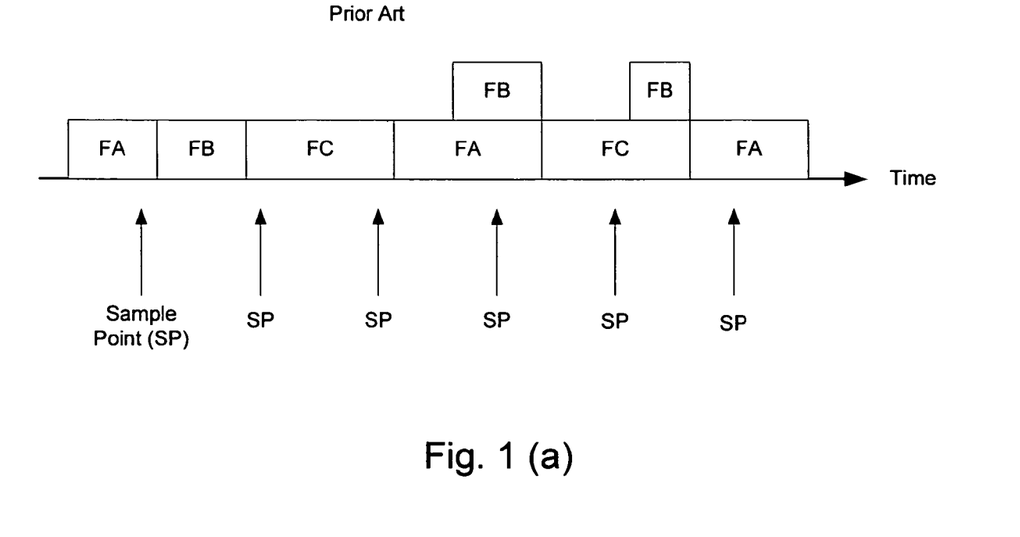
FIGS. 1(a) and 1(b) are diagrams of exemplary prior art methods for acquiring profile data.

FIG. 1(a) depicts an example of sampling. FIG. 1(a) is a time profile of a notional computer program where functions within the computer program FA, FB, FC are being executed at various times according to needs of the program. In FIG. 1(a), regularly time-spaced sampling intervals (SP) are indicated where a profiler function would sample the system operation to determine its state at the time of sampling. Typically, such sampling would involve reading a program counter or instruction pointer to determine the subroutine being run representing each function. The frequency at which the program counter or instruction pointer was a particular value provides an estimate of how often the processor was executing that instruction or subroutine. Or the samples for all instructions within a function can be grouped together to produce a report of top time-consuming functions. Sampling at intervals other than time can provide an indication of consumers of other resources. For example, if it is possible to sample every "Nth" cache miss, then you could estimate the functions which produce the highest number of cache misses.

"Per-occurrence" measurement is done every time a particular event occurs. The main forms of this measurement are counting the number of times an event occurs, or querying the time at the beginning and end of a work interval and subtracting to find the amount of time taken to perform that work. The "instrumentation" to count the event or to measure the interval may be added to the code manually, or may be built-in to the code by a compilation tool. FIG. 1(b) is an example of "per-occurrence" measurement in a software time profile where instrumentation is used to determine system events. Each test point (TP) in FIG. 1(b) represents the beginning or end of an event, such as the beginning or end of a function within the software run profile.

The two techniques of sampling and per-occurrence profiling both have advantages and disadvantages. The per-occurrence measurement cannot be performed for code which does not contain any instrumentation. Also, duration timing measures nearly-exact running time, but the measurement itself can skew results by affecting the duration. For example, the work required to read the time on entry and exit to a function is much larger in proportion to the run-time of small functions than it is in proportion to the run-time of large functions. Per-occurrence measurement can also produce a very large amount of data if the occurrences happen very often. For example, logging the entry and exit of every function in an application shown in FIG. 1(b) will add up quickly.

On the other hand, sampling, as in FIG. 1(a) typically produces much less data. Rather than capturing every moment in time, time-based sampling is scaled back to sample at a relatively low frequency. In fact, the sampling frequency can be adjusted to suit the situation; sampling too often produces too much data, while sampling too infrequently leads to inaccuracy of measurement. For example, an ill-spaced sampling interval as in FIG. 1(a) would miss two of the three occurrences of function FB. That inaccuracy is the disadvantage of sampling; since samples only provide you with captures for a very small portion of the overall whole, the result is only an estimate rather than an exact measurement. Chance sampling within functions that occur very rarely can make those functions appear to take a higher proportion of time than they actually do appear. Sampling is also susceptible to errors related to events that occur at the sampling interval. For example, if a profiler is sampling the processor instruction pointer once every 100 milliseconds, and some other event is occurring once every 100 milliseconds, then the profiler could possibly miss every instance of that event, or it could possibly hit every instance of that event, making it appear as though the event-handling code was running 0% or 100% of the time, respectively, when in truth the event-handling code would be running at some intermediate level between the extremes.

An ideal system would gather all of the data available and then process the data without affecting the run of the application. However, data memory and processing time are normally limited, so a better approach would be to take a minimum amount of data to gain a maximum amount of insight as to how a system was behaving during run time. However, that minimum amount of data is difficult to predict and instrument. Thus, there is a need for a technique which can perform a variety of profiling functions in a time efficient manner, gathering a reasonable amount of data, and produce results without greatly affecting the run time performance of the system under test. The present invention addresses the aforementioned needs and solves them with additional advantages as expressed herein.

SUMMARY OF THE INVENTION

An embodiment of the invention includes a method for profiling the software function calls of a system under development. A development system can include target software that a developer desires to optimize. The subject invention allows a user to track function calls made by the target application. These function calls can be made to functional aspects of the target application or to functional aspects of the operating system upon which the target application relies. The user is permitted to select between multiple modes which allow the selection between a level of intrusion and an amount of data collected by a profiler. In one aspect of the invention, a programmable interrupt is used to collect data from the stack of a processor executing the target code. The interrupt driven profiler is less intrusive because it uses user-programmable interrupts which are not compiled into the target code. This reduces the effect of profiling on the runtime operation of the target code.

BRIEF DESCRIPTION OF THE DRAWINGS

The foregoing summary, as well as the following detailed description of exemplary embodiments, is better understood when read in conjunction with the appended drawings. For the purpose of illustrating embodiments of the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

In an embodiment of the invention, a profiler can collect instruction counter or program counter information from a call stack during a currently running software thread. The call stack data is collected when an application programming interface is activated via an interrupt handler. The captured call stack includes program counter information for the running application as well as within the operating system processes. An embodiment of the invention allows data to be captured in multiple modes allowing the user to select the amount of data to be collected as well as the level of program counter detail relative to the application and system processes.

Exemplary Embodiments of the Invention

Figure 2:
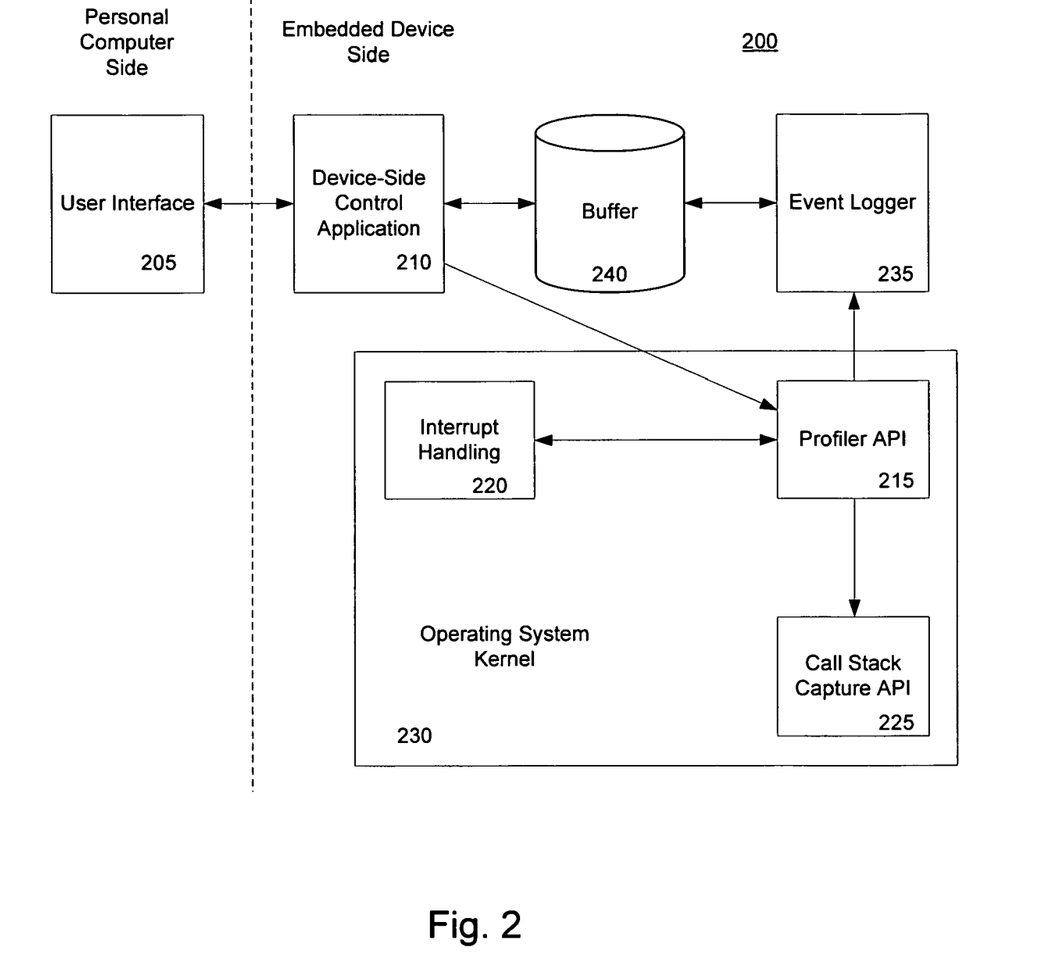
FIG. 2 is a block diagram of a system involving aspects of the invention.

FIG. 2 is a depiction of a software system 200 block diagram for collecting profiling information concerning a software process within an embedded system. User interface 205 resides on the personal computer side of the system 200 allowing the user to interface with a control system which communicates with the embedded device under test. The user interface furnishes a means for controlling data collection on the embedded device (not shown) and for displaying the data. This user interface 205 can communicate via network, serial, parallel, USB or other connection with a device-side control application 210. The user interface potentially allows users to write their own device-side control applications. In one embodiment, the user interface includes a desktop or device side set of tools for configuring the profiler functions and running the profiler against a target embedded device in a development environment. In one embodiment, the user interface 205 operates in a Microsoft® Windows XP® operating system environment available from Microsoft® in Redmond Wash.

The device side control application 210 serves to receive communications from the user interface 205 and communicate with the profiler application programming interface (API) 215 to start and stop the data collection functions of the call stack capture API 225. The profiler API 215 is part of the operating system kernel 230 of the embedded development system and also functions to transfer information concerning interrupt parameters, such as interval timing and a service routine address to the interrupt handler 220. After setup, the interrupt handler can then notify the profiler API 215 of the occurrence of an interrupt.

The call stack capture API 225 performs three functions. Once the interrupt is enabled, the interrupt will fire automatically at the specified interval. The interrupt handler 220 will inform the profiler API 215 to start a data collection session. The profiler API 215 enables the call stack capture API 225 to retrieve the call stack. The profiler API 215 also invokes an event logger to record the call stack for the currently-running thread. In one embodiment, the event logger is a straightforward text file recording mechanism that saves the call stack information. In another embodiment, the event logger is an embedded system data logger used to record both call stack information as well as other data. The event logger uses and passes any collected information to a buffer 240.

The device-side control application 210 is responsible for eventually removing the call stack data from the buffer 240 and either communicating it back to the user interface 205 on the desktop PC, saving it in a file, or performing some other operation on the data. In an alternative embodiment, the user interface may be on the device side. Eventually, on prompt from the user, the device-side control application 210 will call the kernel profiler API 215 to stop profiling, at which point it will disable the profiling interrupt and flush any necessary data buffers. Thus, the level of activity in capturing call stack information is dependent upon the user settings. Also note that a re-compiling of the user application with test points is not required in the current invention as may be required with other prior art profilers.

Figure 3:
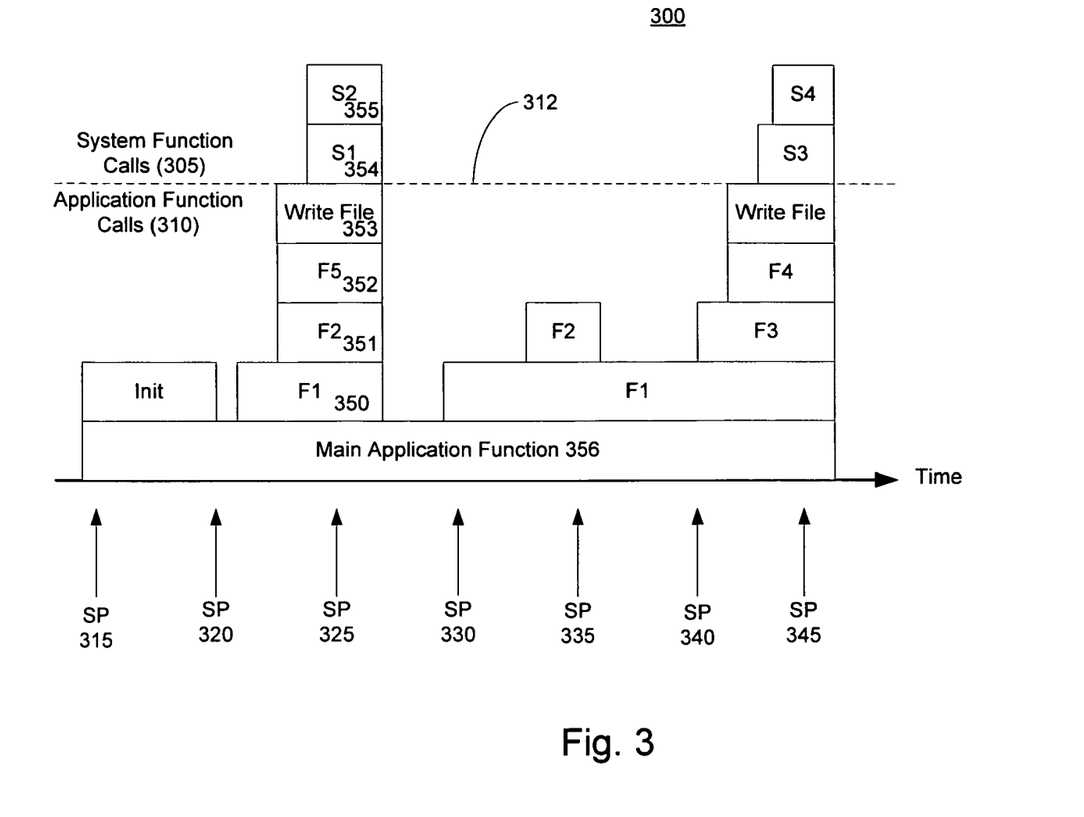
FIG. 3 is a diagram showing profiling aspects of the invention.

FIG. 3 is an exemplary software activity profile 300 showing aspects of the invention. In the exemplary profile 300, sample points (SP) are noted as timing points 315-345 where an interrupt occurs to sample data from the call stack of a currently running software thread. In one embodiment, such as with the use of Microsoft Windows® CE operating system, the call stacks for application (user mode) and system (kernel mode) are not separate entities. Therefore, acquisition or capture of one call stack for the entire current thread includes code indicative of both application call 310 and system call 305 functions.

For example, a sample at SP 325 yields a call stack that is indicative of the main application function 356 and application software function F1 350, F2 351, F5 352 and the write to file call 353. The call stack request also retrieves the instruction pointers for system functions S1 354 and S2 355. Thus, using the call stack acquisition aspect of the invention, both system calls 305 as well as application calls 310 can be collected during a sample of the software process 300 thread. This ability can provide a body of rich information content for the embedded system operation.

Commonly assigned patent application Ser. No. 10/940,454 entitled "Call Stack Capture Using Interrupt Driven Architecture" filed Sep. 15, 2004 discloses a method and system for acquiring the full application and system call stack and is herein incorporated by reference in its entirety. The above-referenced disclosure describes the operations performed to capture the call stack of the currently-running thread at the time a profiler interrupt occurs and is described below. The call stack information concerning the thread that was running is gathered when the profiler interrupt is generated. In one embodiment, an interrupt handler is not executed within the context of any thread, so the interrupt handler must obtain call stack information about the thread it interrupted. Once the call stack information has been gathered, it is supplied to the kernel profiler API. The kernel call stack capture API gathers a thread context in order to traverse the thread's stack. A thread context is a set of registers and other state information about the thread which varies within per CPU type. The traversal is performed even on non-x86 processors which do not store a frame pointer for each frame on the stack. In one embodiment of the referenced application, the interrupt handler alters the state of the thread to induce the thread to invoke the kernel's call stack API itself, using its own context. The handler performs this by saving some of the thread's registers into the thread's stack, and then changing the thread's program counter register to contain the address of some code which calls the kernel's call stack API. The process then restores the thread's saved registers from the stack and resumes what the thread was doing before the interrupt. This method of "injecting" code into a running thread provides the call stack data to the kernel profiler API.

In one embodiment of the current invention of the present application, three operating modes are offered. In a first mode, the statistical sampling mode, the top most program counter in the call stack is acquired upon receipt and servicing of an interrupt. In a second mode, the full call stack mode, the entire call stack is acquired for each sample. This mode makes it possible to see where execution time is being spent anywhere in the system, including in operating system code. The third mode, the application stack mode, captures only the call stack up to the point where the thread leaves its source application. This mode makes it possible to see where execution time is being spent within only the application. For example, this mode of operation would access and record only call stack information that resides below level 312 in FIG. 3 and has the advantage of reducing the amount of gathered data by a significant amount. This mode also reduces the amount of intrusiveness of the profiler itself as well as the amount of performance impact related to storage or transportation of the gathered data.

In one embodiment of the invention, the above mentioned mode options may be provided to the user giving her the ability to gather extra system information unavailable in prior art profiling equipment. Providing the user with the ability to trade off between information and performance impact and data storage will make the profiler more usable for embedded device development. In many instances embedded devices are far more constrained than desktop PCs in terms of processor power or storage capacity. The desktop-side user interface 205 of FIG. 2 will provide options for choosing the call stack scope, so that users can make the tradeoff between level of detail and level of intrusion. The kernel profiler API 215 will also expose these mode options. When the profiler is turned on, it will store the user's settings, so that when the interrupt handler 220 calls the profiler API 215, the profiler API 215 can call the kernel call stack capture API 225 with the user's preferential mode and parameter settings.

In the first mode, statistical sample, the top most program counter during a series of interrupts is collected over time. The captured data is a stream of program counters from all the interrupts, where the program counter is the address of an instruction. The stream of data may appear as follows:

<addr1>
<addr2>
<addr3>
... etc.

Where, since instructions can be executed more than once, the entries in the stream are most likely not all unique; that is, some addresses may be duplicated. Post processing of this data reveals the utility of capturing such data.

During post processing of mode 1 data, the program counter address data is matched to the function that the address corresponds to in the relevant software code. Then, the post processing counts up all the hits for all the functions. For example, if function Foo( ) is in memory between <addr4> and <addr5>, and the captured sample <addr1> is between <addr4> and <addr5>, then we know that the captured sample was inside function Foo( ). Function Foo( ) would be entered into data corresponding to the span of two addresses within the code. All of the captured samples and added up the number of samples in each function is provided. At the end of this portion of post processing, the functions are sorted by the number of hits in each function, and a report is generated of the functions that had the most samples. Generally speaking, the number of samples per function roughly corresponds to the amount of time spent inside that function. In one embodiment, the processed data is may presented as functions with percentages as shown in Table 1:

TABLE 1

| Function | No. of samples | Percentage of total |
| --- | --- | --- |
| Foo( ) | 300 samples | 58% |
| Bar( ) | 200 samples | 39% |
| Moo( ) | 10 samples | 1% |

In another embodiment, the collected sampled data is added up according to all of the functions inside a software module, and the report includes the modules with the most hits. For example, if Foo( ) and Bar( ) are inside mycode.dll, then we will attribute all the hits from Foo( ) and Bar( ) to mycode.dll as shown in Table 2:

TABLE 2

| Module | Samples | Percentage |
| --- | --- | --- |
| mycode.dll | 500 samples | 98% |
| other.dll | 10 samples | 1% |

When a user is investigating a performance problem, and knows she spends 58% of her time inside function Foo( ), she has two options to reduce that time. One option is to make Foo( ) run in less time by reducing the work it does or improving its algorithm, and the second option is to call Foo( ) fewer times. A profiler having aspects of the current invention can help users identify what code they can rewrite to run in less time. But the user may still not be able to determine where the calls to Foo( ) are originating. A deeper level of information may be necessary and this deeper level is provided in modes 2 and 3.

In one embodiment, a variant of mode 1 captures a single call stack frame instead of capturing the top program counter. In general, the single frame can either be the top of the whole call stack including system calls or the top of the application's part of the call stack. The advantage of capturing only a single stack frame is that it reduces the performance impact of the profiler itself, and reduces other secondary effects such as network usage or storage consumption. By providing it as an option, this mode 1 single stack operation gives the user the ability to choose between gathering a large amount of data and corresponding detail for diagnosing problems and gathering a bare minimum of information.

In the single stack frame mode, the operation of the profiling system 200 of FIG. 2 is similar except that the call stack API 225 is not invoked. Referring to FIG. 2, the desktop-side user interface 205 will provide options to the user for choosing call stack scope, so that users can make the tradeoff between level of detail and level of intrusion. The kernel profiler API 215 will also expose these options. When the profiler is turned on, it will store the user's setting. If only a single stack frame is being captured, the profiler API 215 does not need to invoke the kernel call stack API 225. Instead, the profiler API 215 can copy the register that contains the interrupted thread's program counter. This greatly reduces the amount of work that must be done while servicing the profiler interrupt, as well as greatly reduces the amount of data used to store one profiler sample.

Figure 4:
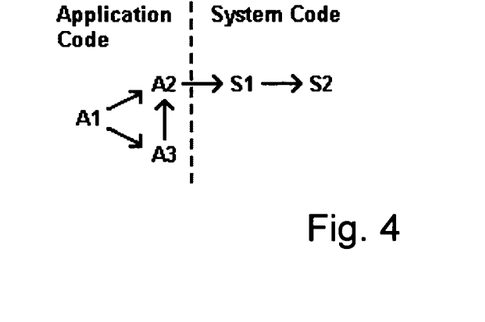
FIG. 4 is a diagram showing an exemplary relationship between an application and system function calls.

Mode two, full call stack mode, captures the entire call stack including system calls during an interrupt. The captured data is a stream of program counters plus call stacks from all the interrupts. In one embodiment, there is a process of mapping addresses to functions as previously described. A log of which functions were running at the interrupt sample times is also generated. As an example, suppose an application has function A1( ) which calls functions A2( ) and A3( ). Function A2( ) calls into system function S1( ), which calls system function S2( ). Function A3( ) calls function A2( ). To help illustrate, you might draw a call graph like that shown in FIG. 4. The data that the profiler captures while this program is running might look something like that shown in Table 3:

TABLE 3

| Function | Description |
|---|---|
| A1 | Sampled when A1 was the only function running |
| A1 to A2 | Sampled while A2 is running, and was called by A1 |
| A1 to A2 to S1 to S2 | Sampled while S2 is running |
| A1 to A2 to S1 to S2 | The same sample again, perhaps S2 was running for a very long time or was called more than once. |
| A1 to A3 to A2 | Sampled while A2 is running, but this time A2 was called by A3 which was called by A1. |
| A1 to A3 to A2 to S1 to S2 | Sampled while S2 was running called by S1 which was called by A2 which was called by A3 which was called by A1. |

In mode 2, each sample is an entire call stack instead of a single code address as in mode 1. The stream of data is a set of call stacks, where each call stack may be repeated more than once. The call stacks are not captured at the moment the calls are made, but at the times when the profiler interrupt fires. The interrupt fires unpredictably from the point of view of what code is running in the target program. For example, on some runs the profiler interrupt may happen to never fire inside a call to S2, and so no call stacks including S2 would be recorded. However, a greater granularity of data reporting can be obtained by setting the interrupt interval to be shorter as to capture an instance of a function within a target program.

In one embodiment, a number of reports are presented concerning the collected data set. For example, it is possible to derive the same data reported in mode 1 from mode 2 data. The program counter recorded in mode 1 corresponds to the top function on the stack that's recorded in mode 2. Table 4 shows how the mode 2 data from Table 3 can be processed to produce results similar to those in Table 1.

TABLE 4

| Module | Samples | Percentage |
|---|---|---|
| S2 | 3 samples | 50% |
| A2 | 2 samples | 33% |
| A1 | 1 sample | 17% |

Similarly, one report can add up time inside the modules that S2, A2 and A1 are inside. As part of another report, the mode 2 data can be processed to accumulate inclusive and exclusive sample counts for each part of the call graph. Where "inclusive" counts are the number of profiler samples that included that part of the graph, and "exclusive" counts are the number of profiler samples that were that exact graph. For example, post-processing could accumulate inclusive counts for all possible call graphs from the samples listed in Table 3 above. The results may be presented in a format similar to Table 5.

TABLE 5

| Graph | Inclusive count | Inclusive % (of 6 samples) |
|---|---|---|
| A1 | 6 (since all 6 samples from Table 3 have the graph "A1" at the base) | 100% |
| A1 to A2 | 3 (since 3 of the 6 samples from Table 3 have the graph "A1 to A2" at the base) | 50% |
| A1 to A2 to S1 | 2 (this is at the base of 2 samples) | 33% |
| A1 to A2 to S1 to S2 | 2 | 33% |
| A1 to A3 | 2 | 33% |
| A1 to A3 to A2 | 2 | 33% |
| A1 to A3 to A2 to S1 | 1 | 17% |
| A1 to A3 to A2 to S1 to S2 | 1 | 17% |

Inclusive counts can provide an approximation of the amount of time that it took to call a function, from entry to exit. From the time the program entered A1 to the time it exited A1, 100% of the program ran-time passed. From the time A1 called A2 until the time A2 returned, 50% of the program run-time passed. Accumulated exclusive counts for all possible call graphs from the samples listed above result in the data of Table 6.

TABLE 6

| Graph | Exclusive count | Exclusive % (of 6 samples) |
|---|---|---|
| A1 | 1 (since one sample above is just "A1") | 17% |
| A1 to A2 | 1 (since there is one sample that is just "A1 to A2") | 17% |
| A1 to A2 to S1 | 0 (since there are no samples that are just this graph) | 0% |
| A1 to A2 to S1 to S2 | 2 | 33% |
| A1 to A3 | 0 | 0% |
| A1 to A3 to A2 | 1 | 17% |

TABLE 6-continued

| Graph | Exclusive count | Exclusive % (of 6 samples) |
|---|---|---|
| A1 to A3 to A2 to S1 | 0 | 0% |
| A1 to A3 to A2 to S1 to S2 | 1 | 17% |

Exclusive counts correspond to a more in-depth version of the data than collected in mode 1. For example, if running Mode 1, a user could interpret that there are 3 samples in S2 and that S2 was executing for 50% of the program time. In Mode 2, a user can interpret that S2 had 2 samples where the call came from A1 to A2 to S1, and 1 sample where the call came from A1 to A3 to A2 to S1. Mode 1 data provides a percentage of time spent executing the code in S2, but mode 2 data indicates how that time divides among the various functions that called S2.

In one embodiment, the inclusive and exclusive counts can be presented together in a single graphic format such that a user could expand or collapse parts of the graph, to assist the discovery of subsets of data that are interesting to the user. For example, there are additional views that are possible with mode 2 data. A user may desire to generate a view that adds up inclusive and exclusive counts for subsets of the data. For example, the subset of all calls made by A2, regardless of what function called A2, can be presented as in Tables 7 and 8.

TABLE 7

| Graph | Inclusive count | Inclusive % (of the 5 samples that include A2) | Inclusive % (of the 6 total samples) |
|---|---|---|---|
| A2 | 5 (five of the six original sampled callstacks include A2 somewhere in the middle) | 100% | 83% |
| A2 to S1 | 3 | 60% | 50% |
| A2 to S1 to S2 | 3 | 60% | 50% |

TABLE 8

| Graph | Exclusive count | Exclusive % (of the 5 samples that include A2) | Exclusive % (of the 6 total samples) |
|---|---|---|---|
| A2 | 2 (two sampled callstacks have the sub-graph "A2" on the top) | 40% | 33% |
| A2 to S1 | 0 (no callstack has the sub-graph "A2 to S1" on the top) | 0% | 0% |
| A2 to S1 to S2 | 3 | 60% | 50% |

Using mode 1 data, a user may only know that A2 itself was running for 33% of time; corresponding to the statistic that 33% of overall time was spent exclusively inside A2. Using mode 2 data, a user can discern the exclusive and inclusive break-downs of what functions called A2, what functions A2 called. Similarly, another view could add up the subset of all calls made to A2, regardless of what functions A2 called afterwards as shown in Table 9.

TABLE 9

| Graph | Inclusive count | Inclusive % (of the 5 samples that include A2) | Inclusive % (of the 6 total samples) |
|---|---|---|---|
| A1 to A2 | 3 | 60% | 50% |
| A1 to A3 to A2 | 2 | 40% | 33% |

One of skill in the art will recognize that post processing affords many options to a user in the presentation of data using mode 2 data.

In the third mode, the application stack mode, a call stack representing only the application portion of a call stack is collected and recorded as a result of a profile interrupt. Mode 3 is just like mode 2, except that we record only the part of the call stack that is within the application software thread. Using the same example program data as in the table 3 data of mode 2 data, the application only data would appear as in Table 10.

TABLE 10

| Function | Description |
|---|---|
| A1 | |
| A1 to A2 | |
| A1 to A2 | The call to S1 to S2 was not recorded, so this stack is indistinguishable from the previous one |
| A1 to A2 | |
| A1 to A3 to A2 | |
| A1 to A3 to A2 | Again, the call to S1 to S2 was not recorded |

Post processing the exemplary data in Table 10 as before in Table 5 results in the inclusive data of Table 11. Notice that although there are fewer rows in Table 11, the results do not vary from the results of Table 5.

TABLE 11

| Graph | Inclusive count | Inclusive % (of 6 samples) |
|---|---|---|
| A1 | 6 | 100% |
| A1 to A2 | 3 | 50% |
| A1 to A3 | 2 | 33% |
| A1 to A3 to A2 | 2 | 33% |

Similarly, the exclusive results from Table 10 are provided as in Table 12. Notice that there are fewer rows than Table 6 from which to add exclusive counts, and the exclusive results of Table 12 are different from the mode 2 data of Table 6.

TABLE 12

| Graph | Exclusive count | Exclusive % (of 6 samples) |
|---|---|---|
| A1 | 1 | 17% |
| A1 to A2 | 3 | 50% |
| A1 to A3 | 0 | 0% |
| A1 to A3 to A2 | 2 | 33% |

Note that all the same views are possible in mode 3 data as in mode 2 data, but mode 3 data does not include break-downs of time inside system calls and thus some profile results are affected. However, from an application programmer's point of view, application data is valuable because the application response is controllable by the programmer, whereas the system kernel response is generally not under application programmer control.

Figure 5:
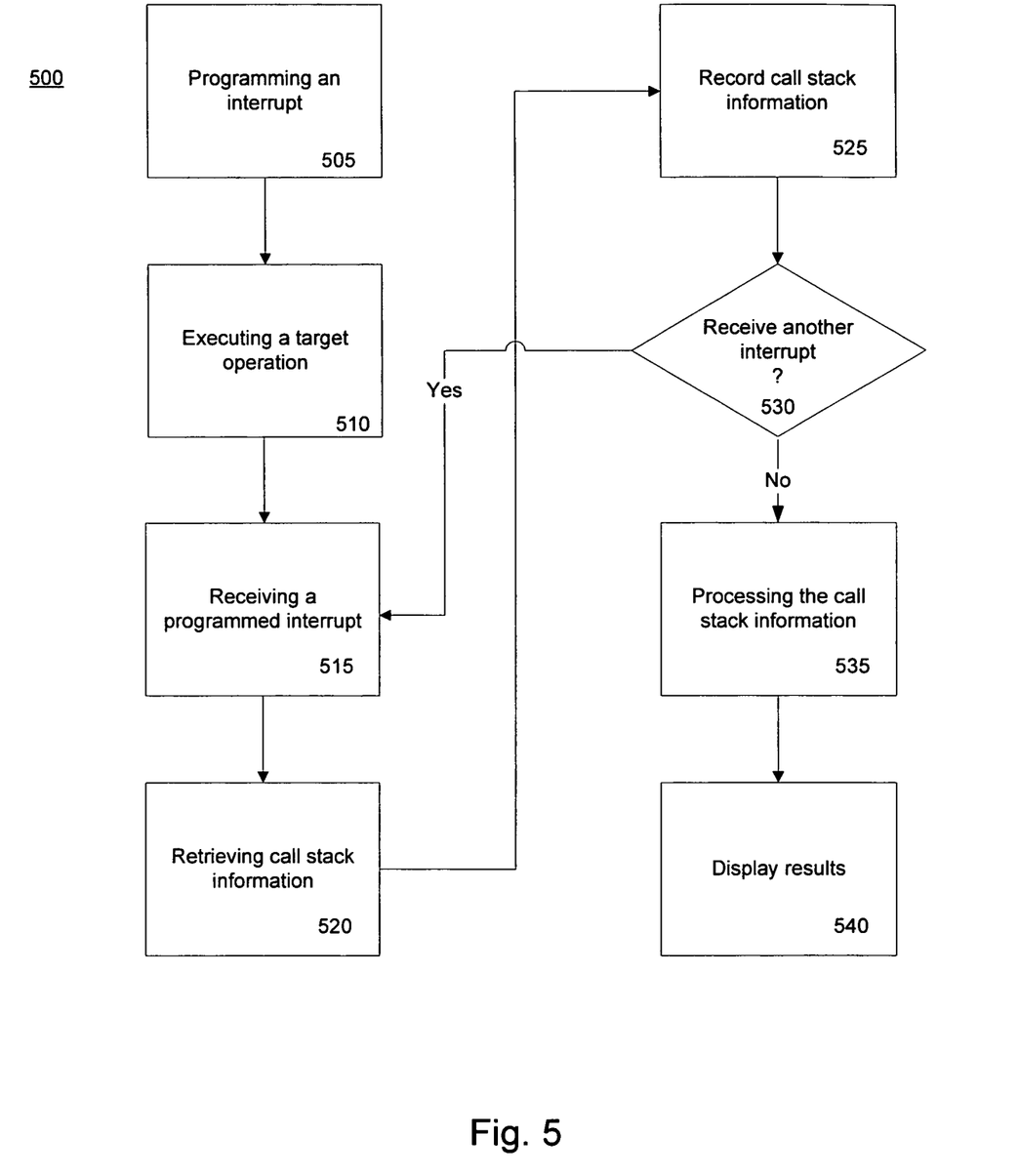
FIG. 5 is a flow diagram of an embodiment of the method of the invention.

FIG. 5 depicts a flow diagram of an exemplary process 500 of the current invention. The process may begin with a user setting up an interrupt (step 505) to be used in the capture of profile information from a target software application. The programmed interrupt may be programmed using a user interface where a user can select parameters defining the programmable interrupt parameters, such as, but not limited to, an interrupt interval timing, type of mode and interrupt service handling options. The programmed interrupt information is entered into a development system interrupt controller. In one exemplary implementation, an application programming interface transfers the interrupt control information and provides it to an interrupting handling module. The target software application or operation is executed (step 510) and one of the programmed interrupts is received (step 515).

Once an interrupt is received (step 515), an interrupt handler services the interrupt by acquiring call stack information. This call stack information can include both application and system level program counter and other ancillary information. Depending of the mode selected by the process 500 records the call stack information (step 525) in a variety of data levels. In a first mode, only a top most program counter information is recorded. This information could be an address of code in either a target application or in the operating system. In a second mode, stack data with addresses of both target application and target operating system code is recorded. In a third mode, only the stack data for a target application is recorded.

Once recorded, the process 500 awaits the receipt of another interrupt (step 530). Another interrupt may occur as a result of the appearance of a programmed interrupt or an expectation by the controller application that another interrupt will occur. If another interrupt does occur, then the process 500 receives another interrupt (step 515) and steps 520 and 525 are repeated.

If another interrupt is not expected, if a timeout occurs, or if the user terminates the process, then post-processing begins (step 535). Post-processing retrieves information concerning the call stack information for each interrupt received and serviced. The call stack information may be processed to develop statistics concerning the operation of the application or operating system at the time the interrupts occurred. The post-processing may include generating statistics corresponding to the mode of operation of data collection. If application data only is collected, then only application data is processed into statistical information. But if both application and system data is selected via the user selected mode, then both may be processed. The processed data may include statistics concerning the percentage of time that a specific function was operating as a result of executing the target code. The function could include an application function or a system function as reflected by the user selected mode. The data can be a listing of the functions entered and exited, or it may be more complex counts of occurrences of call stacks including or excluding the sub-calls made from those stacks.

Upon generation of statistics concerning the data collected in the user-selected mode (step 535), the post processed data and statistics may be displayed to the user (step 540). This display of results may be in the form of graphs, tables or figures, and format selection may be dependent on user preferences.

Exemplary Computing Device

Figure 6:
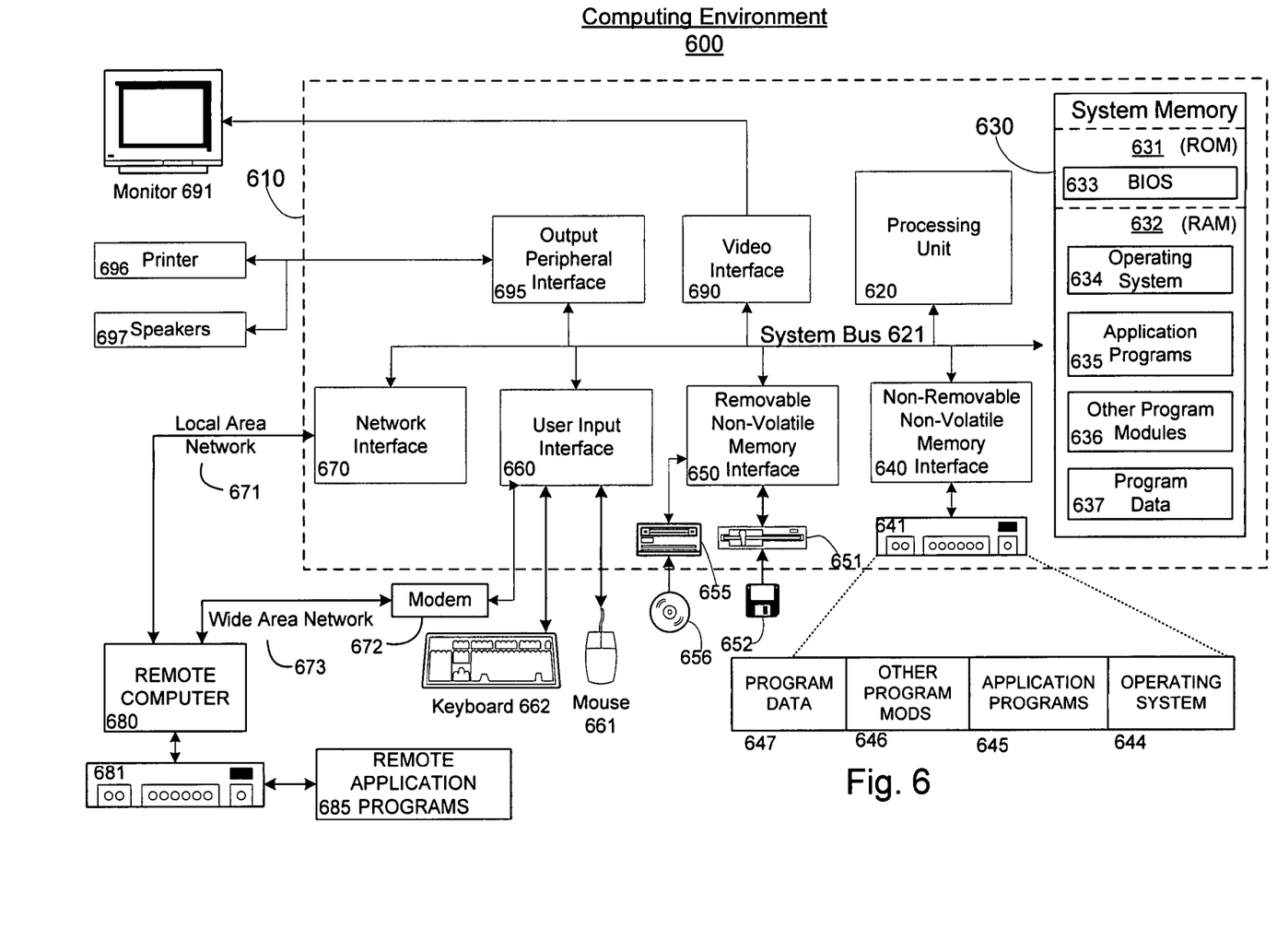
FIG. 6 is a block diagram showing an exemplary computing environment in which aspects of the invention may be implemented.

FIG. 6 and the following discussion are intended to provide a brief general description of a suitable computing environment in which embodiments of the invention may be implemented. While a general purpose computer is described below, this is but one single processor example, and embodiments of the invention with multiple processors may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

FIG. 6 thus illustrates an example of a suitable computing system environment 600 in which the embodiments of the invention may be implemented, although as made clear above, the computing system environment 600 is only one example of a suitable computing environment and is not intended to suggest any limitation as to the scope of use or functionality of an embodiment of the invention. Neither should the computing environment 600 be interpreted as having any dependency or requirement relating to any one or combination of components illustrated in the exemplary operating environment 600.

With reference to FIG. 6, an exemplary system for implementing an embodiment of the invention includes a general purpose computing device in the form of a computer system 610. Components of computer system 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 610 typically includes a variety of computer readable media. Computer readable media can be any available media that can be accessed by computer system 610 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer system 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer system 610 may also include other removable/non-removable, volatile/nonvolatile computer storage media. By way of example only, FIG. 6 illustrates a hard disk drive 641 that reads from or writes to non-removable, non-volatile magnetic media, a magnetic disk drive 651 that reads from or writes to a removable, nonvolatile magnetic disk 652, and an optical disk drive 655 that reads from or writes to a removable, nonvolatile optical disk 656, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6 provide storage of computer readable instructions, data structures, program modules and other data for the computer system 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer system 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus 621, but may be connected by other interface and bus structures, such as a parallel port, game port or a universal serial bus (USB). A monitor 691 or other type of display device is also connected to the system bus 621 via an interface, such as a video interface 690, which may in turn communicate with video memory (not shown). In addition to monitor 691, computer systems may also include other peripheral output devices such as speakers 697 and printer 696, which may be connected through an output peripheral interface 695.

The computer system 610 may operate in a networked or distributed environment using logical connections to one or more remote computers, such as a remote computer 680. The remote computer 680 may be a personal computer, a server, a router, a network PC, a peer device or other common network node, and typically includes many or all of the elements described above relative to the computer system 610, although only a memory storage device 681 has been illustrated in FIG. 6. The logical connections depicted in FIG. 6 include a local area network (LAN) 671 and a wide area network (WAN) 673, but may also include other networks/buses. Such networking environments are commonplace in homes, offices, enterprise-wide computer networks, intranets and the Internet.

When used in a LAN networking environment, the computer system 610 is connected to the LAN 671 through a network interface or adapter 670. When used in a WAN networking environment, the computer system 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer system 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a software program profiler for an embedded system. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of an embodiment of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method of acquiring profile information, the method comprising:
    gathering a thread context using a stack capture API in preparation for traversing a thread call stack;
    receiving a programmed interrupt at pre-set specified time intervals while executing an application in a computer system;
    receiving the thread context and a pre-determined call stack scope setting comprising the level of retrieval of thread call stack information required by a user wherein the call stack scope is the application stack or a combination of both the application and operating system stacks;
    servicing the interrupt by saving operational registers and changing a program counter register to contain the address of a kernel API such that the call stack information is acquired consistent with the requested call stack scope and then restoring the saved operational registers, wherein the call stack information comprises the application stack and system program counter data; and
    processing the call stack information to produce statistical information concerning function calls, wherein the profile information comprises the statistical information.

2. The method of claim 1, further comprising recording the call stack information required by the call stack scope setting comprising the user mode and parameter settings.

3. The method of claim 1, wherein processing the call stack information further comprises generating statistics concerning:
    a number of samples wherein any one function call is at a top of the recorded call stack information;
    a number of samples wherein a series of functions calls are included in the recorded call stack information; and
    a number of samples wherein a set of function calls are at the top of the recorded call stack information.

4. The method of claim 1, wherein servicing the interrupt further comprises recording the call stack information for the application program counter data and discarding the system program counter data.

5. The method of claim 1, further comprising recording a top frame of the call stack information and discarding other frames.

6. The method of claim 1, further comprising recording a top frame of the call stack information from the application program counter data and discarding the system program counter data along with other frames of application program counter data.

7. The method of claim 1, wherein receiving an interrupt further comprises receiving an interrupt wherein the interrupt interval is user-selectable.

8. A system, comprising a processor, for analyzing software processes in an embedded development environment, the system comprising:
    a user interface of the processor to control the embedded development environment and input user preferential mode and parameter settings;

means for executing instructions of a control software application to perform the method comprising:

generating an interrupt at pre-set specified time intervals while a target system is executing a software application under test;

receiving a pre-determined call stack scope setting comprising the level of retrieval of thread call stack information required by a user wherein the call stack scope is the application stack or a combination of both the application and operating system stacks;

servicing the interrupt by saving operational registers and changing the program counter register to contain the address of a kernel API such that call stack information is acquired consistent with the requested call stack scope and then restoring the saved operational registers, wherein the call stack information comprises the application stack and system program counter data; and processing the call stack information to produce statistical information concerning function calls of the software application under test, wherein the profile information comprises the statistical information.

9. The system of claim 8, further comprising:

an event logger application to record one or more of the call stack information and the statistical information upon a memory device.

10. The system of claim 8, wherein the method step of processing the call stack information further comprises generating statistics concerning:

a number of samples wherein any one function call is at a top of the recorded call stack information;

a number of samples wherein a series of function calls are included in the recorded call stack information; and a number of samples wherein a set of function calls are at the top of the recorded call stack information.

11. The system of claim 8, wherein the method steps further comprise recording the call stack information from the application program counter data and discarding the system program counter data.

12. The system of claim 8, wherein the method steps further comprise recording a top frame of the call stack information and discarding other frames.

13. The system of claim 8, wherein the method steps further comprise recording a top frame of the call stack information from the application program counter data and discarding the system program counter data along with other frames of application program counter data.

14. The system of claim 8, wherein one or more application programming interfaces performs the steps of programming an interrupt with user-definable parameters and conducting a call to capture a stack upon assertion of the interrupt.

15. A computer readable storage medium having computer-executable instructions for performing a method for acquiring profile information, the method comprising:

gathering a thread context using a stack capture API in preparation for traversing a thread call stack;

receiving a programmed interrupt at pre-set specified time intervals while executing an application in a computer system;

receiving the thread context and a pre-determined call stack scope setting comprising the level of retrieval of thread call stack information required by a user wherein the call stack scope is the application stack or a combination of both the application and operating system stacks;

servicing the interrupt by saving operational registers and changing the program counter register to contain the address of a kernel API such that call stack information is acquired consistent with the call stack scope setting and then restoring the saved operational registers, wherein the call stack information comprises the application stack and system program counter data; and processing the call stack information to produce statistical information concerning function calls, wherein the profile information comprises the statistical information.

16. The computer-readable storage medium of claim 15, wherein the step servicing the interrupt further comprises recording the call stack information.

17. The computer-readable storage medium of claim 15, wherein the step of processing the call stack information further comprises generating statistics concerning:

a number of samples wherein any one function call is at a top of the recorded call stack information;

a number of samples wherein a series of function calls are included in the recorded call stack information; and a number of samples wherein a set of function calls are at the top of the recorded call stack information.

18. The computer-readable storage medium of claim 15, wherein the step of servicing the interrupt further comprises recording the call stack information from the application program counter data and discarding the system program counter data.

19. The computer-readable storage medium of claim 15, further comprising recording a top frame of the call stack information and discarding other frames.

20. The computer-readable storage medium of claim 15, further comprising recording a top frame of the call stack information from the application program counter data and discarding the system program counter data along with other frames of application program counter data.

21. A computer-readable storage medium having computer-executable instructions for performing a method for acquiring profile information, the method comprising:

gathering a thread context using a stack capture API in preparation for traversing a thread call stack;

receiving a programmed interrupt at pre-set specified time intervals while executing an application in a computer system;

receiving the thread context and a pre-determined call stack scope setting comprising the level of retrieval of thread call stack information required by a user wherein the call stack scope is the application stack or a combination of both the application and operating system stacks;

servicing the interrupt by saving operational registers and changing the program counter register to contain the address of a kernel API such that call stack information is acquired consistent with the requested call stack scope and then restoring the saved operational registers, wherein the call stack information comprises the application stack and system program counter data; and processing the call stack information to produce statistical information concerning function calls, wherein the profile information comprises the statistical information.

* * * * *